(12) United States Patent
Okazaki

(10) Patent No.: US 10,610,932 B2
(45) Date of Patent: Apr. 7, 2020

(54) LAMINATE SHAPING APPARATUS

(71) Applicant: Sodick Co., Ltd., Kanagawa (JP)

(72) Inventor: Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 28 days.

(21) Appl. No.: 16/151,673

(22) Filed: Oct. 4, 2018

(65) Prior Publication Data

US 2019/0105715 A1  Apr. 11, 2019

(30) Foreign Application Priority Data

Oct. 6, 2017  (JP) ................................. 2017-196348

(51) Int. Cl.
| | |
|---|---|
| *B33Y 50/02* | (2015.01) |
| *B22F 3/24* | (2006.01) |
| *B33Y 30/00* | (2015.01) |
| *B33Y 40/00* | (2020.01) |
| *B22F 3/105* | (2006.01) |

(52) U.S. Cl.
CPC .............. *B22F 3/24* (2013.01); *B22F 3/1055* (2013.01); *B33Y 30/00* (2014.12); *B33Y 40/00* (2014.12); *B22F 2003/1056* (2013.01); *B22F 2003/247* (2013.01); *B22F 2998/10* (2013.01); *Y02P 10/295* (2015.11)

(58) Field of Classification Search
CPC .................................. B29C 64/30; B33Y 30/10
See application file for complete search history.

(56) References Cited

U.S. PATENT DOCUMENTS

| | | | |
|---|---|---|---|
| 5,126,529 | A | 6/1992 | Weiss et al. |
| 5,286,573 | A | 2/1994 | Prinz et al. |
| 5,301,415 | A | 4/1994 | Prinz et al. |
| 2006/0208396 | A1 | 9/2006 | Abe et al. |
| 2017/0014905 | A1* | 1/2017 | Kawada ................ B33Y 30/00 |

(Continued)

FOREIGN PATENT DOCUMENTS

| | | |
|---|---|---|
| CN | 104493491 A | 4/2015 |
| DE | 11 2004 000 302 B3 | 8/2010 |
| DE | 10 2017 106 261 A1 | 9/2017 |

(Continued)

OTHER PUBLICATIONS

Japanese Office Action dated Mar. 20, 2018 of corresponding application No. JP2017-196348; 7 pgs.

(Continued)

*Primary Examiner* — Joseph S Del Sole
*Assistant Examiner* — Thu Khanh T Nguyen
(74) *Attorney, Agent, or Firm* — Maier & Maier, PLLC

(57) ABSTRACT

A lamination shaping apparatus that is able to reduce machining errors in subsequent cutting while suppressing upsizing and cost increase compared to a conventional lamination shaping apparatus. A lamination shaping apparatus includes a pair of first horizontal movement mechanisms, a gantry disposed on the pair of first horizontal movement mechanisms, a second horizontal movement mechanism mounted on the gantry, and a machining head disposed on the second horizontal movement mechanism. A shaping table is disposed between the pair of first horizontal movement mechanisms. The second horizontal movement mechanism is disposed above the shaping table. The machining head includes a tool bit.

5 Claims, 20 Drawing Sheets

(56) References Cited

U.S. PATENT DOCUMENTS

2017/0173689 A1\* 6/2017 Okazaki ................ B33Y 30/00
2017/0274590 A1   9/2017 Okazaki

FOREIGN PATENT DOCUMENTS

| JP | H01-78713 A | 3/1989 |
| JP | H05-345245 A | 12/1993 |
| JP | H06-93411 A | 4/1994 |
| JP | 2016-113679 A | 6/2016 |

OTHER PUBLICATIONS

Office Action dated Dec. 17, 2019 in corresponding German Application No. 10 2018 124 517.3; 7 pages.

\* cited by examiner

1

LAMINATE SHAPING APPARATUS

FIELD

The present invention relates to a lamination shaping apparatus.

BACKGROUND

A lamination shaping method using laser light is a method for forming an integral sintered body consisting of multiple sintered layers and having a desired three-dimensional shape and involves forming a very thin material powder layer on a shaping table movable in the up-down direction in a sealed chamber filled with an inert gas, irradiating a predetermined area of the material powder layer with laser light to sinter the material powder in the predetermined area, and repeating these steps. Such a lamination shaping method is performed by a lamination shaping apparatus.

For example, a lamination shaping apparatus disclosed in Japanese Unexamined Patent Application Publication No. 2016-113679 performs the above lamination shaping method, as well as forms a shaped product by cutting the edge of a sintered body of a material powder into a required shape using a cutting tool such as an end mill that can move synchronously in the direction of one vertical axis and the directions of two horizontal axes. The lamination shaping apparatus forms a desired laminated shaped product through the combination and repetition of these steps. Such a lamination shaping apparatus (so-called "combined machine") is advantageous in that a single apparatus can form a desired laminated shaped product.

SUMMARY

However, a combined machine includes a driver for properly operating a cutting tool and therefore the entire combined machine or a chamber included therein tends to be upsized. For example, if the cutting tool is an end mill, the combined machine includes a machining head that moves while having the cutting tool mounted thereon, as well as a movement apparatus that moves the machining head in three directions consisting of the direction of one vertical axis and the directions of two horizontal axes. Further, the machining head requires a high-speed turning mechanism that rotates the cutting tool at high speed. Also, a combined machine performs cutting in a dry atmosphere. Dry cutting is performed without applying cutting oil or cooling water to the machining position. Dry cutting produces no lubrication effects and causes large friction compared to wet cutting, which involves application of cutting oil or the like, and therefore a combined machine has to maintain high runout accuracy to suppress the runout of the cutting tool during machining. For this reason, with respect to a combined machine, primary importance is given to the accuracy with which the position and length of the cutting tool mounted on the machining head are measured and the accuracy with which a tool is mounted during tool replacement. Also, a combined machine has difficulty in performing laser machining and cutting simultaneously and therefore is disadvantageous in terms of production line.

On the other hand, most lamination shaping apparatuses do not have a cutting mechanism and therefore must feed a shaped product to another machine so that the shaped product is cut precisely. Such a lamination shaping apparatus is small and advantageous in terms of production line compared to a combined machine as described above. However, the shaped product is fed to another apparatus and subjected to machining (so-called secondary machining) and therefore significant dimension errors or the like are more likely to occur during machining compared to a combined machine, making it difficult to obtain the secondary-machined final product as a precisely finished product. As a result, a shaped product must be designed and shaped so as to sufficiently allow for misregistration during secondary machining, for example, so as to have little too large a cutting allowance. Thus, the time for laminate shaping and the time for secondary machining are increased.

The present invention has been made in view of the foregoing, and an object thereof is to provide a lamination shaping apparatus that is able to reduce machining errors in subsequent cutting while suppressing upsizing and cost increase compared to a conventional lamination shaping apparatus.

The present invention provides a lamination shaping apparatus configured to form a laminated shaped product that has yet to be machined into a shape of a desired final product by a different machine, by forming a material powder layer having a predetermined thickness on a shaping table movable in the direction of one vertical axis, the material powder layer corresponding to each of division layers obtained by dividing a shape of the laminated shaped product by the predetermined thickness, and by irradiating a predetermined area of the material powder layer with laser light to form a sintered layer, and repeating formation of the sintered layer. The lamination shaping apparatus includes a pair of first horizontal movement mechanisms, a gantry disposed on the pair of horizontal movement mechanisms, a second horizontal movement mechanism mounted on the gantry, and a machining head disposed on the second horizontal movement mechanism. The shaping table is disposed between the pair of first horizontal movement mechanisms. The second horizontal movement mechanism is disposed above the shaping table. The machining head includes a tool bit. The tool bit is configured shape a first and a second reference surfaces and a third reference surface with respect to the laminated shaped product, the first and the second reference surfaces perpendicular to the shaping table and perpendicular to each other, and the third reference surface parallel with the shaping table, the first to the third reference surfaces are references surfaces used for positioning when the different machine machines the laminated shaped product. The machining head is configured to move the tool bit in the directions of two horizontal axes parallel with the shaping table and to turn around an axis in the direction of the one vertical axis.

The lamination shaping apparatus of the present invention is characterized in that the machining head includes the tool bit and the tool bit can shape the two surfaces (the two surfaces correspond to the first and the second reference surfaces in Claim 1) and the surface (the surface corresponds to the third reference surface in Claim 1) with respect to the laminated shaped product, the two surfaces perpendicular to the shaping table and perpendicular to each other, and the surface parallel with the shaping table. That is, the lamination shaping apparatus of the present invention does not require a large driver unlike a conventional combined machine. Thus, the entire apparatus can be downsized. The shaped product obtained by the lamination shaping apparatus of the present invention has the shaped reference surfaces and is subsequently cut by the different apparatus that performs secondary machining. Thus, the relationship between the reference surfaces and the shaped product can be maintained and therefore the shaped product can be precisely finished as a final product in secondary machining. The lamination shaping apparatus of the present invention makes design and shaping allowing for misregistration during secondary machining unnecessary compared to a conventional lamination shaping apparatus not including a cutting mechanism. This can reduce the cutting allowance to a required minimum size and reduce the time for secondary machining, thereby reducing the machining time required to obtain a final product.

Various embodiments of the present invention are described below. The embodiments below can be combined with each other.

Preferably, the gantry is disposed on the pair of first horizontal movement mechanisms so as to be movable in a first direction, the machining head is disposed on the second horizontal movement mechanism so as to be movable in a second direction perpendicular to the first direction, and the first direction and the second direction are horizontal directions.

Preferably, the machining head is configured to turn the tool bit so that the tool bit is placed in one of a first state and a second state, and the second state is a state obtained by turning the tool bit in the first state by 90°.

Preferably, the lamination shaping apparatus further includes a base and a chamber covering the pair of first horizontal movement mechanisms, the gantry, the second horizontal movement mechanism, the machining head, and the tool bit on the base, each of the first horizontal movement mechanisms includes a first guide rail extending in the first direction and a first guide block that moves in the first direction while engaging with the first guide rail, the second horizontal movement mechanism includes a second guide rail extending in the second direction and a second guide block that moves while engaging with the second guide rail, the first guide rail is fixed onto the base, the gantry has one end fixed to the first guide block of one of the pair of first horizontal movement mechanisms and the other end fixed to the first guide block of the other of the pair of first horizontal movement mechanisms, the second guide rail is fixed to the gantry, and the machining head is fixed to the second guide block.

Preferably, the machining head includes a turning mechanism mounted so as to be able to turn the tool bit, the turning mechanism turns the tool bit so that the tool bit is placed in one of a first state and a second state, the first state is a state in which when the machining head moves in the first direction, a blade of the tool bit is oriented in a direction in which the blade is able to shape the laminated shaped product in the first direction, the second state is a state in which when the machining head moves in the second direction, the blade of the tool bit is oriented in a direction in which the blade is able to shape the laminated shaped product in the second direction, and the second state is a state obtained by turning the tool bit in the first state by 90°.

BRIEF DESCRIPTION OF THE DRAWINGS

FIGS. 18A to 18C are schematic views showing the shaping direction in the reference surface shaping step, in which FIG. 18A shows a direction parallel with a shaping table; FIG. 18B shows a direction perpendicular to the shaping table; and FIG. 18C shows shaping along directions parallel with and perpendicular to the shaping table;

DETAILED DESCRIPTION

1. Embodiment

An embodiment of the present invention will be described with reference to the drawings. Various features described in the embodiment below can be combined with each other.

1.1 Overall Configuration

Figure 1:
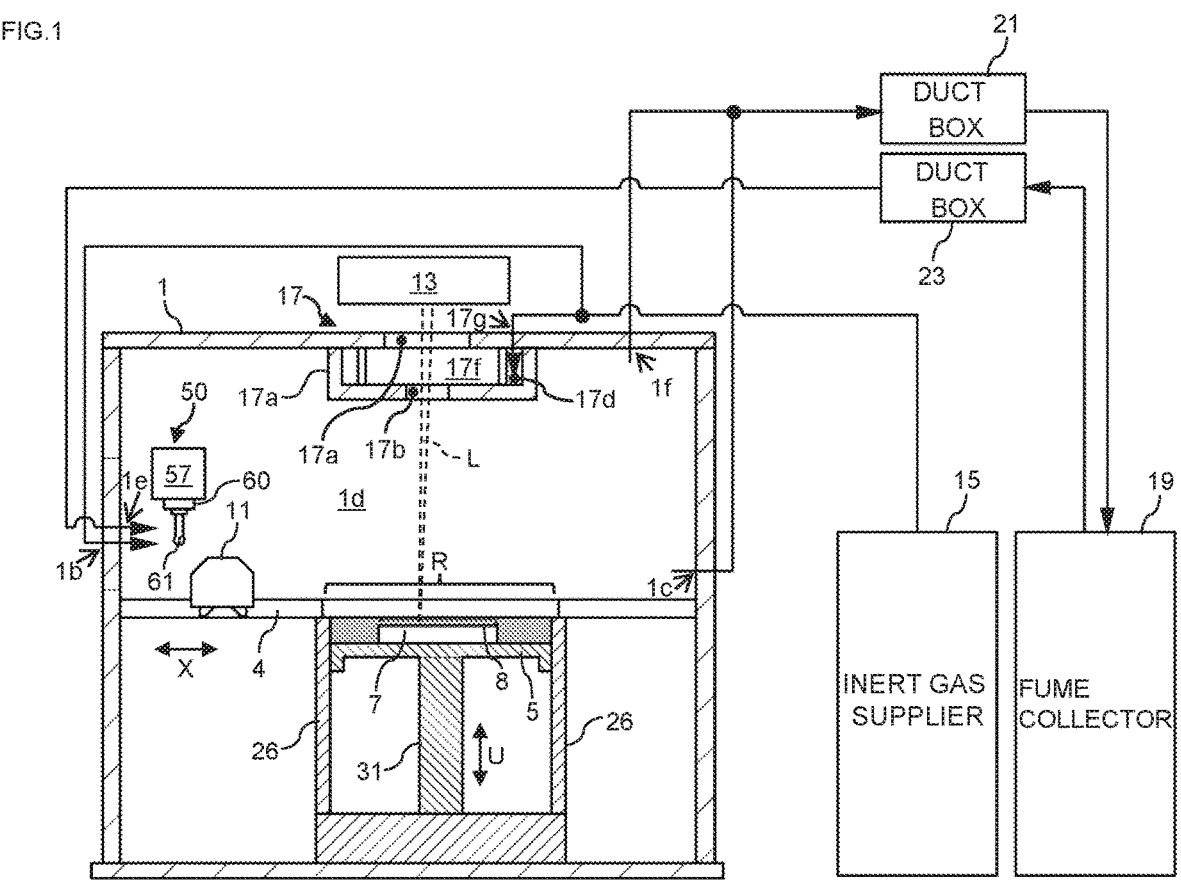
FIG. 1 is a schematic configuration view of a lamination shaping apparatus according to an embodiment of the present invention.

FIG. 1 is a schematic configuration view of a lamination shaping apparatus according to the embodiment of the present invention. As shown in FIG. 1, the lamination shaping apparatus according to the embodiment of the present invention includes a chamber 1 and a laser light emitter 13.

The chamber 1 covers a required shaping area R and is filled with an inert gas having a predetermined concentration. The chamber 1 contains a powder layer formation apparatus 3 and has a fume diffuser 17 thereon. The powder layer formation apparatus 3 includes a base 4 and a recoater head 11.

The base 4 has the shaping area R in which a laminated shaped product is formed. A shaping table 5 is placed in the shaping area R. When driven by a shaping table driver 31, the shaping table 5 can move in the vertical direction represented by the up-down direction (the direction of an arrow U in FIG. 1). While the lamination shaping apparatus is in operation, a material powder layer 8 is formed on a shaping plate 7 disposed on the shaping table 5. A predetermined irradiation area is present in the shaping area R and approximately matches an area surrounded by the contour of a desired three-dimensional shaped product.

A powder holding wall 26 is disposed around the shaping table 5. A yet-to-be-sintered material powder is held in a powder holding space surrounded by the powder holding wall 26 and shaping table 5. Although not shown in FIG. 1, a powder outlet from which the material powder in the powder holding space can be discharged may be provided in a lower portion of the powder holding wall 26. In this case, the yet-to-be-sintered material powder is discharged from the powder outlet by lowering the shaping table 5 after lamination/shaping is complete. The discharged material powder is guided to a shooter by a shooter guide and poured into a bucket through the shooter.

Figure 2:
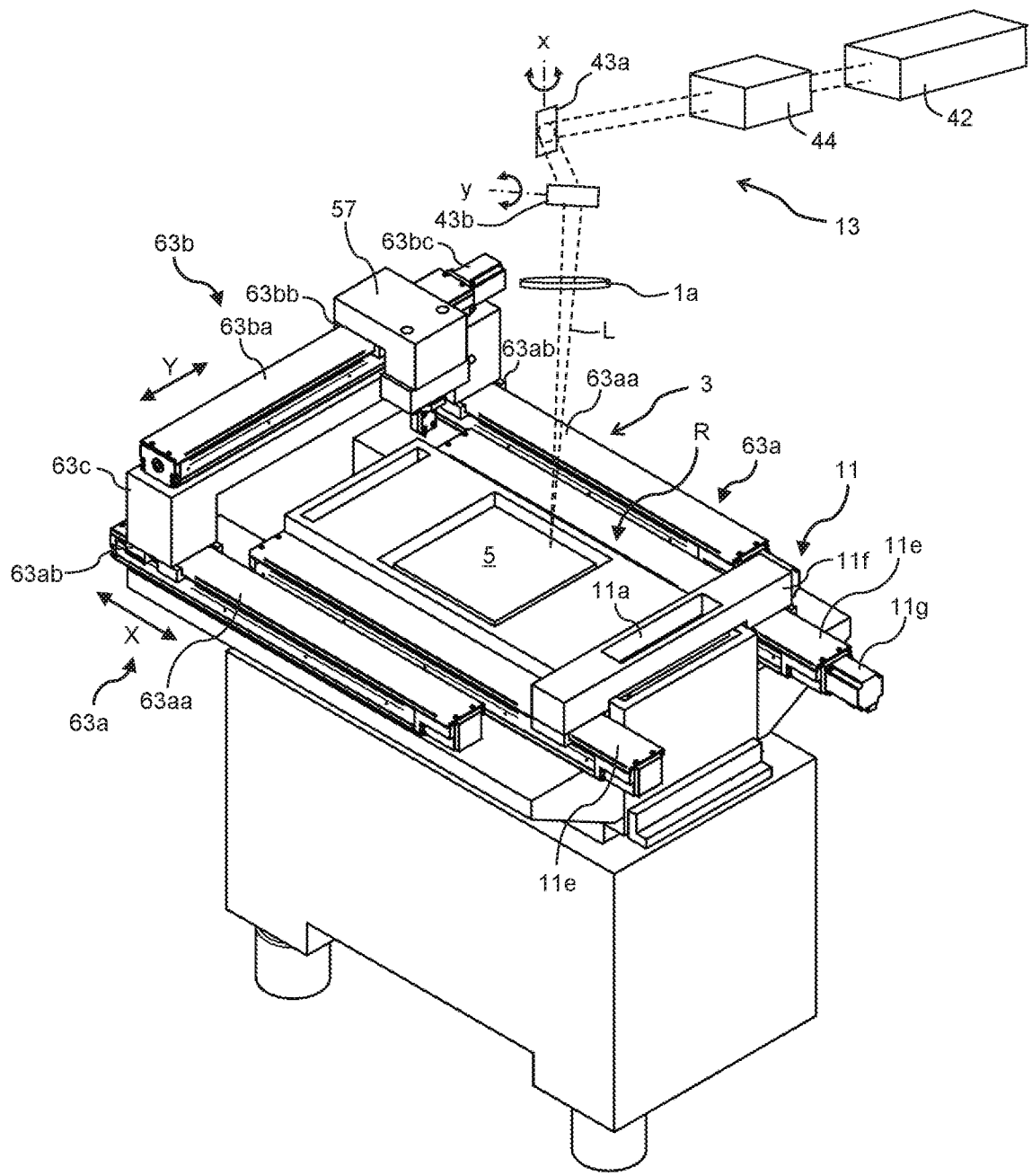
FIG. 2 is a perspective view of a powder layer formation apparatus and the like according to the embodiment of the present invention.
Figure 3:
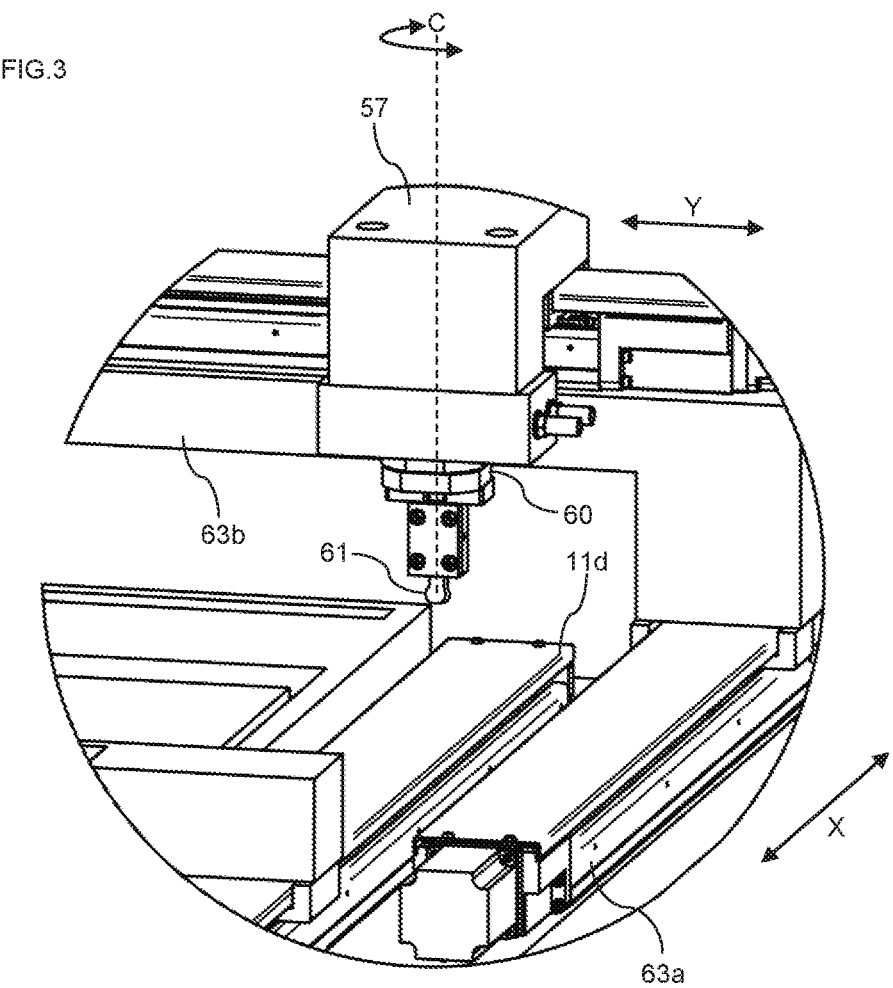
FIG. 3 is perspective view seen from an angle different from an angle in FIG. 2 and is an enlarged view showing, in particular, a machining head.
Figure 4:
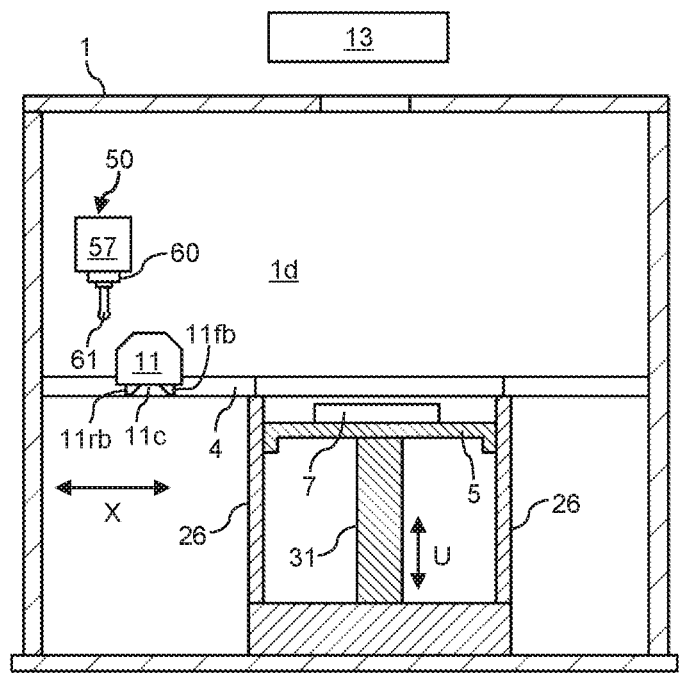
FIG. 4 is a drawing showing a lamination shaping method (lamination step) using the lamination shaping apparatus.

FIGS. 2 and 3 are perspective views of the powder layer formation apparatus 3 and the like according to the embodiment of the present invention. FIG. 4 shows a schematic side view of the recoater head 11 according to the embodiment of the present invention. The recoater head 11 includes a material container 11a, a material inlet 11b, and a material outlet 11c.

The material container 11a contains the material powder. The material powder is, for example, a spherical metal powder (e.g., iron powder) having an average particle size of 20 μm. The material inlet 11b is provided in the upper surface of the material container 11a and serves as a port through which the material powder supplied from a material supplier (not shown) is charged into the material container 11a. The material outlet 11c is provided in the bottom surface of the material container 11a, and the material powder in the material container 11a is discharged therefrom. The material outlet 11c is a slit (not shown) extending in the direction of one horizontal axis (the direction of an arrow Y) perpendicular to the movement direction of the recoater head 11 (the direction of an arrow X). As shown in FIG. 2, the recoater head 11 is configured such that it can be moved horizontally by a pair of recoater head horizontal movement mechanisms 11d, 11d.

The recoater head horizontal movement mechanisms 11d include guide rails 11e extending in the movement direction of the recoater head 11 (the direction of the arrow X) and guide blocks 11f that move while engaging with the guide rails 11e. Both ends of the recoater head 11 are fixed to the pair of guide blocks 11f, 11f, and the recoater head 11 is guided in a predetermined movement direction (the direction of the arrow Y). The pair of recoater head horizontal movement mechanisms 11d, 11d are disposed on the base 4 such that the shaping table 5 is sandwiched therebetween. One or both of the pair of recoater head horizontal movement mechanisms 11d, 11d includes a rotary motor 11g, a ball screw shaft (not shown) that is rotated by the rotary motor 11g and whose rotation axis is disposed in parallel with the guide rails 11e, and a nut (not shown) that is fastened to the positively or reversely rotating ball screw shaft and moves forward or backward in the direction of the rotation axis. The moving nut is mounted to the recoater head 11 with the guide blocks 11f therebetween.

The recoater head 11 has blades 11fb, 11rb disposed on both side surfaces thereof. The blades 11fb, 11rb disperse the material powder. In other words, the blades 11fb, 11rb flatten the material powder discharged from the material outlet 11c to form a material powder layer 8.

The fume diffuser 17 is disposed on the upper surface of the chamber 1 so as to cover a window 1a. The fume diffuser 17 includes a cylindrical case 17a and a cylindrical dispersion member 17c disposed in the case 17a. An inert gas supply space 17d is provided between the case 17a and dispersion member 17c. An opening 17b is provided inside the dispersion member 17c in the bottom surface of the case 17a. The dispersion member 17c has many pores (not shown), and a clear inert gas inert supplied to the gas supply space 17d is sufficiently supplied to a clean chamber 17f through the pores. The clean inert gas sufficiently supplied to the clean chamber 17f is ejected toward below the diffuser 17 through the opening 17b. In the present specification, the term "inert gas" refers to a gas that does not substantially react with the material powder and is, for example, a nitrogen gas, argon gas or helium gas.

The laser light emitter 13 is disposed above the chamber 1. The laser light emitter 13 sinters a predetermined area of the material powder layer 8 formed on the shaping area R by irradiating the predetermined area with laser light L. Specifically, the laser light emitter 13 includes a laser source 42, a focus control unit 44, and a laser scanner. The laser scanner of the present embodiment includes biaxial galvanometer mirrors 43a, 43b. The galvanometer mirrors 43a, 43b include actuators that rotate the galvanometer mirrors 43a, 43b.

The laser source 42 emits the laser light L. As used herein, the term "laser light L" refers to a laser that is able to sinter a material powder and is, for example, a $CO_2$ laser, fiber laser, or YAG laser.

The focus control unit 44 condenses the laser light L outputted from the laser source 42 to adjust it to a desired spot diameter. The biaxial galvanometer mirrors 43a, 43b two-dimensionally scan the material powder layer 8 with the laser light L outputted from the laser source 42 while controlling the laser light L. Specifically, the galvanometer mirror 43a scans the material powder layer 8 with the laser light L in the direction of the arrow X, while the galvanometer mirror 43b scans the material powder layer 8 with the laser light L in the direction of the arrow Y. The rotation angle around the rotation axis x of the galvanometer mirror 43a and the rotation angle around the rotation axis y of the galvanometer mirror 43b are controlled in accordance with the magnitudes of rotation angle control signals received from a controller (not shown). Thus, by changing the magnitudes of the rotation angle control signals inputted to the actuators of the galvanometer mirrors 43a, 43b, a desired position can be irradiated with the laser light L.

The laser light L passed through the galvanometer mirrors 43a, 43b is passed through the window 1a disposed on the chamber 1 and applied to the material powder layer 8 formed on the shaping area R. The window 1a is formed of a material capable of passing the laser light L. For example, if the laser light L is a fiber laser or YAG laser, the window 1a can be formed of quartz glass. Note that use of the galvanometer mirrors 43a, 43b is illustrative only and scanning with the laser light L may be performed using other means.

1.2 Inert Gas Supply/Discharge System Next, an inert gas supply/discharge system will be described. The inert gas supply/discharge system includes multiple inert gas inlets and multiple inert gas outlets provided in the chamber 1 and piping connecting the inlets and outlets and an inert gas supplier 15 and a fume collector 19. In the present embodiment, the inlets include a chamber inlet 1b, a sub-inlet 1e, and a fume diffuser inlet 17g, and the outlets include a chamber outlet 1c and a sub-outlet 1f.

The chamber outlet 1c is provided in a side plate of the chamber 1. An aspirator (not shown) is preferably provided so as to be connected to the chamber outlet 1c. The aspirator helps efficiently remove fumes from the emission path of the laser light L. The aspirator allows a greater amount of fumes to be discharged from the chamber outlet 1c, making fumes less likely to be diffused in a shaping space 1d.

The chamber inlet 1b is provided over an edge of the base 4 so as to face the chamber outlet 1c with a predetermined irradiation area therebetween. The inert gas is supplied from the chamber inlet 1b toward the chamber outlet 1c. This is advantageous in that the inert gas always flows in the same direction, enabling stable sintering. As shown in FIG. 1, the chamber inlet 1b and chamber outlet 1c may be aligned in the movement direction of the recoater head 11 (the direction of the arrow X) with the shaping table 5 therebetween. Or, the chamber inlet 1b and chamber outlet 1c may be aligned in the direction of one horizontal axis (the direction of the arrow Y) perpendicular to the movement direction of the recoater head 11 (the direction of the arrow X) with the shaping table 5 therebetween.

The inert gas supply/discharge system of the present embodiment also includes a sub-inlet 1e which is provided in a side plate of the chamber 1 so as to face the chamber outlet 1c and through which the fumes-removed, clean inert gas supplied from the fume collector 19 is supplied to the shaping space 1d, a fume diffuser inlet 17g which is provided in an upper surface of the chamber 1 and through which the inert gas is supplied to the fume diffuser 17, and a sub-outlet 1f which is provided above the chamber outlet 1c and through which the inert gas remaining in an upper portion of the chamber 1 and containing a large amount of fumes is discharged.

The inert gas supplier 15 and fume collector 19 are connected to a system that supplies the inert gas to the chamber 1. The inert gas supplier 15 has an inert gas supply function and includes, for example, a membrane-type nitrogen separator that extracts a nitrogen gas from ambient air. In the present embodiment, as shown in FIG. 1, the inert gas supplier 15 is connected to the chamber inlet 1b and fume diffuser inlet 17g.

The fume collector 19 has duct boxes 21, 23 on the upstream side and downstream side thereof, respectively. The fumes-containing inert gas discharged from the chamber 1 through the chamber outlet 1c and sub-outlet 1f is fed to the fume collector 19 through the duct box 21. The fume collector 19 removes fumes from the inert gas and feeds the resulting clean inert gas to the sub-inlet 1e of chamber 1 through the duct box 23. This configuration enables reuse of the inert gas.

As shown in FIG. 1, the chamber outlet 1c and sub-outlet 1f are connected to the fume collector 19 through the duct box 21, forming a fume discharge system. The fumes-removed, clean inert gas is fed back from the fume collector 19 to the chamber 1 for reuse.

1.3 Shaping Apparatus

Next, a shaping apparatus 50 of the lamination shaping apparatus of the present embodiment will be described in detail. As shown in FIGS. 1 to 3, the shaping apparatus 50 includes a machining head 57 provided with a turning mechanism 60. The turning mechanism 60 has a shaping tool bit 61 mounted thereon. The machining head 57 of the present embodiment does not include a mechanism that vertically moves the tool bit 61 in the direction of an arrow Z (not shown) parallel with the up-down direction of the shaping table 5 (the direction of the arrow U) and perpendicular to the direction of the arrow X and the direction of the arrow Y. This enables downsizing, lightweight, and low price. Note that the machining head 57 need not be configured as described in the present embodiment and may include a mechanism that vertically moves the tool bit 61.

As shown in FIG. 2, the machining head 57 is disposed on a biaxial bridge mechanism (so-called "gantry mechanism") and can be moved in the directions of two horizontal axes. More specifically, as shown in FIG. 2, a pair of first horizontal movement mechanisms 63a, 63a are disposed outside the pair of recoater head horizontal movement mechanisms 11d, 11d. The pair of first horizontal movement mechanisms 63a, 63a allow a second horizontal movement mechanism 63b to move in the direction of the arrow X. The machining head 57 is disposed on the second horizontal movement mechanism 63b and is allowed to move in the direction of the arrow Y. Thus, the machining head 57 is allowed to move in the directions of two horizontal axes (for example, the directions of the arrows X and Y). The tool bit 61 mounted on the turning mechanism 60 is used to shape two surfaces perpendicular to the shaping table and perpendicular to each other, of the laminated shaped product (the two surfaces correspond to the first and the second reference surfaces in Claim 1 and, for example, one of the two surfaces is represented by the direction of the arrow Z and the direction of the arrow X and the other of the two surfaces is represented by the direction of the arrow Z and the direction of the arrow Y) and a surface parallel with the shaping table (the surface corresponds to the third reference surface in Claim 1 and, for example, the surface is represented by the direction of the arrow X and the direction of the arrow Y). In the present embodiment, the blade of the tool bit 61 has a round shape, but may have any other shape as necessary.

Each first horizontal movement mechanism 63a includes a first guide rail 63aa extending in the direction of the arrow X, in which a gantry 63c moves, and a first guide block 63ab that moves while engaging with the first guide rail 63aa. Both ends of the gantry 63c are fixed to the first guide blocks 63ab, 63ab of the pair of first horizontal movement mechanisms 63a, 63a, and the movement direction thereof is guided by the direction of the arrow X. The pair of first horizontal movement mechanisms 63a, 63a are disposed outside the guide rails 11e, 11e of the pair of recoater head horizontal movement mechanisms 11d, 11d on the base 4. One or both of the pair of first horizontal movement mechanisms 63a, 63a includes a rotary motor 63ac, a ball screw shaft (not shown) which is rotated by the rotary motor 63ac and whose rotation axis is disposed in parallel with the first guide rail 63aa, and a nut (not shown) that is fastened to the positively or reversely rotating ball screw shaft and moves forward or backward in the direction of the rotation axis. The moving nut is mounted to the gantry 63c with the first guide block 63ab therebetween.

The second horizontal movement mechanism 63b includes a second guide rail 63ba extending in the direction of the arrow Y, in which the machining head 57 moves, and a second guide block 63bb that moves while engaging with the second guide rail 63ba. The second guide rail 63ba is mounted on the gantry 63c. The second horizontal movement mechanism 63b also include a rotary motor 63bc, a ball screw shaft (not shown) which is rotated by the rotary motor 63bc and whose rotation axis is disposed in parallel with the second guide rail 63ba, and a nut (not shown) that is fastened to the positively or reversely rotating ball screw shaft and moves forward or backward in the direction of the rotation axis. The moving nut is mounted to the machining head 57 with the second guide block 63bb therebetween. In the embodiment of the present invention, the first horizontal movement mechanisms 63a move the gantry 63c, second horizontal movement mechanism 63b, and machining head 57 together in the direction of the arrow X, while the second horizontal movement mechanism 63b moves only the machining head 57 in the direction of the arrow Y. In the embodiment of the present invention, the elements for shaping the laminated shaped product in the direction of the arrow Y are simpler and therefore more rigid than the elements for shaping it in the direction of the arrow X and therefore the laminated shaped product is shaped in the direction of the arrow Y with higher machining accuracy.

The turning mechanism 60 is able to change the orientation of the tool bit 61 by rotating around a rotation axis C in the direction of the arrow Z (not shown) (the direction of one vertical axis) representing the height direction. In the case of a tool such as an end mill, for example, the turning mechanism 60 must turn it fast. In the present embodiment, on the other hand, it only has to change the orientation of the blade of the tool bit 61. More preferably, the turning mechanism 60 switches the orientation of the blade of the tool bit 61 between a state in which the orientation is along the direction of the arrow X (first state) and a state in which the orientation is along the direction of the arrow Y (second state). In the first state, the laminated shaped product is shaped by moving the machining head 57 in the direction of the arrow X; in the second state, it is shaped by moving the machining head 57 in the direction of the arrow Y. The schematic view shown in FIG. 1 shows the tool bit 61 as being in the second state; the perspective view in FIGS. 2 and 3 show an aspect in which the tool bit 61 is in the first state. In the present embodiment, the turning mechanism 60 turns by 90° to switch the orientation of the blade edge of the tool bit 61 between the first and second states. Thus, the tool bit 61 in the first state shapes the laminated shaped product while moving from the left side to the right, or the tool bit 61 in the second state shapes it while moving from the front side to the back side.

A conventional combined machine typically cuts some sintered layers. Note that the lamination shaping apparatus of the present embodiment first shapes a laminated shaped product (for convenience, referred to as "first temporarily shaped product") in a lamination step (to be discussed in the second section in detail). Then, the lamination shaping apparatus shapes at least one of two surface (the first and the second reference surfaces) perpendicular to the shaping table 5 and perpendicular to each other, of the first temporarily shaped product and a surface (the third reference surface) parallel with the shaping table 5 using the tool bit 61 and thus obtains a second temporarily shaped product, whose at least one reference surface has been shaped. Then, cutting (secondary machining) is performed on the second temporarily shaped product by a machine different from the lamination shaping apparatus of the present embodiment to obtain a desired final shaped product.

The lamination shaping apparatus of the present embodiment has the above configuration and features and thus is expected to produce the following effects.

First, lamination shaping apparatuses are expected to be downsized. For example, a conventional combined machine uses a spindle or the like as a cutting tool and therefore requires a big motor to rotate the spindle or the like fast and a vertical movement mechanism. Also, a conventional combined machine has to use dry cutting as a machining method. Dry cutting produces no lubrication effects and causes large friction and therefore a conventional combined machine has to keep the runout accuracy of the main shaft high to suppress the runout of the cutting tool. Also, a conventional combined machine has to include multiple tools for coarse machining or in accordance with the machining shape and therefore is required to include a tool length measurement device or tool replacement device. On the other hand, the lamination shaping apparatus of the present embodiment uses the tool bit 61 for shaping and therefore does not have to rotate it fast. Of course, it does not have to include a big motor for that purpose. Also, the lamination shaping apparatus of the present embodiment performs shaping alone and therefore only has to adjust the height of the shaping table 5, and the machining head 57 need not be configured to be movable vertically. Thus, the machining head 57 and the entire mechanism to drive it can be downsized compared to those of a conventional combined machine. As a result, the chamber 1 and therefore the entire apparatus can be downsized by 20 to 40%. Also, the lamination shaping apparatus of the present embodiment does not have to include a main shaft and therefore an element to move a main shaft vertically and therefore can be produced at low cost.

Second, the downsized apparatus allows the amount of inert gas supplied to be reduced, as well as allows the amount of inert gas used to be reduced. Also, this apparatus allows the nitrogen filling time to be reduced, keeping the oxygen concentration lower. Also, the downsized chamber 1 allows fumes therein to be easily handled, making shaping quality more likely to be improved or stabilized.

Third, the lamination shaping apparatus of the present embodiment can more easily take a measure to prevent entry of cutting chips into the material powder than a conventional combined machine. The reason is that the lamination shaping apparatus of the present embodiment concentrates only on cutting the reference surface after obtaining the first temporarily shaped product and therefore does not cause entry of chips generated due to cutting in the midst of shaping unlike a conventional combined machine. Note that even a combined machine including a main shaft can obtain the third effect if it does not perform cutting in the midst of shaping and machines only the reference surface after shaping.

Fourth, the second temporarily shaped product is a product whose reference surfaces have been machined. Accordingly, when performing secondary machining, the second temporarily shaped product can be reliably positioned using the reference surfaces thereof. Thus, when secondary machining is complete, a final shaped product can be obtained as a precisely finished product. By using this lamination shaping apparatus, for example, three-dimensional internal piping can be freely installed in a mold for injection molding. The internal piping of a mold is, for example, temperature control piping to circulate temperature-controlled water to control the temperature of the mold and is a representative example that can significantly contribute to reducing the molding time. The thickness from the internal piping to the mold surface influences the performance of the mold. If the thickness is too small, water leakage occurs, or the mold life is affected; if the thickness is too large, cooling performance is affected. For this reason, if a mold is formed using this lamination shaping apparatus, a mold whose thickness from the internal piping to the mold surface does not vary is obtained as a final shaped product, since the second temporarily shaped product is positioned with stable accuracy when subjected to secondary machining. As a result, sufficient cooling effects as designed are obtained. Note that even a combined machine including a main shaft can obtain the fourth effect by cutting reference surfaces after shaping.

2. Lamination Shaping Method

Next, a lamination shaping method using the above lamination shaping apparatus will be described with reference to FIGS. 1 and 4 to 18. In particular, FIGS. 4 to 18 are drawings showing the lamination shaping method using the lamination shaping apparatus according to the embodiment of the present invention. Note that in these drawings, some of the elements shown in FIG. 1 are omitted considering viewability. The steps of the lamination shaping method described below may be performed on the basis of a previously created project file.

Lamination Step

Figure 5:
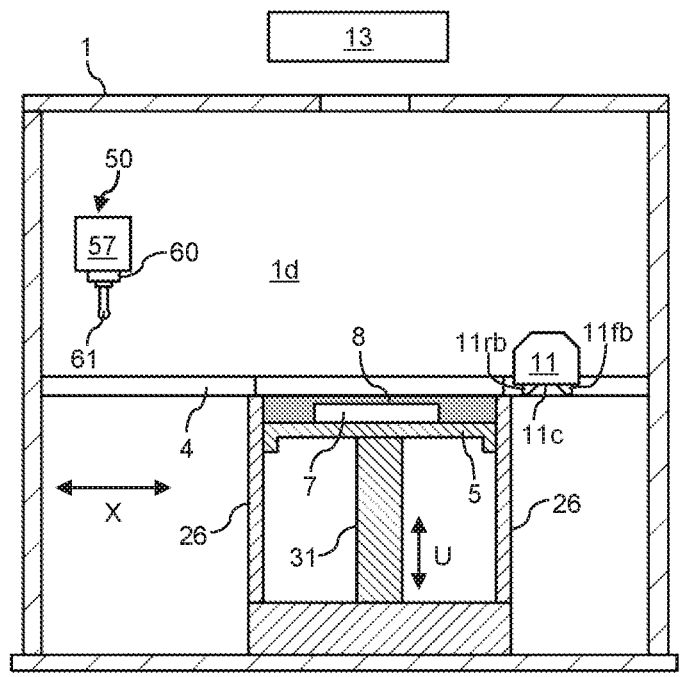
FIG. 5 is a drawing showing the lamination shaping method (lamination step) using the lamination shaping apparatus.

A lamination step is characterized in that a first temporarily shaped product 85 (see FIG. 9 and the like) is formed. First, the height of the shaping table 5 having the shaping plate 7 placed thereon is adjusted to a proper position in the direction of the arrow U (FIG. 4). In this state, the recoater head 11 whose material container 11a is filled with the material powder is moved from the left side to the right side of the shaping area R in the direction of the arrow X. Thus, a first material powder layer 8 is formed on the shaping plate 7 (FIG. 5).

Figure 6:
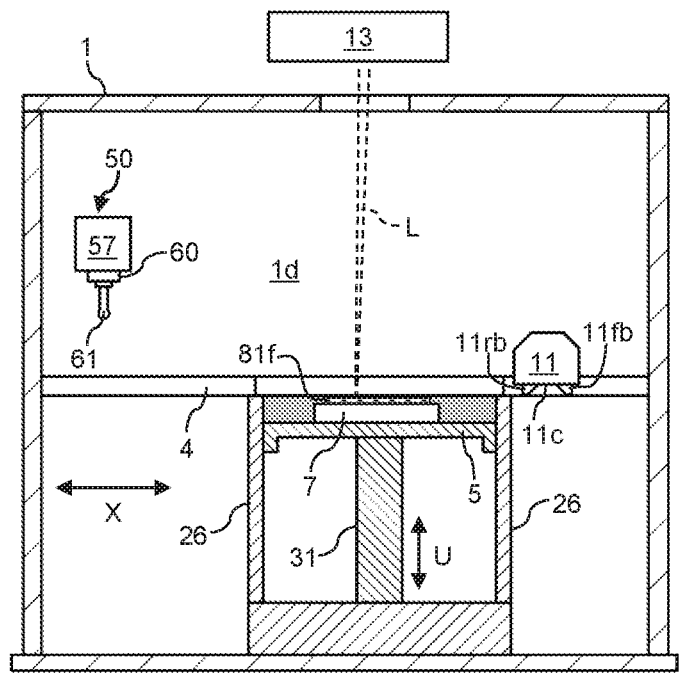
FIG. 6 is a drawing showing the lamination shaping method (lamination step) using the lamination shaping apparatus.

Then, a predetermined area of the material powder layer 8 is sintered by irradiating the predetermined area with laser light L. Thus, as shown in FIG. 6, there is obtained a first sintered layer 81f which is a division layer having a predetermined thickness in the vertical direction with respect to the entire laminated shaped product (the direction of the arrow Z (not shown) parallel with the direction of the arrow U).

Then, the height of the shaping table 5 is lowered in the direction of the arrow U by the predetermined thickness (one layer) of a material powder layer 8, and the recoater head 11 is moved from the right side to the left side of the shaping area R. Thus, a second material powder layer 8 is formed on the sintered layer 81f.

Figure 7:
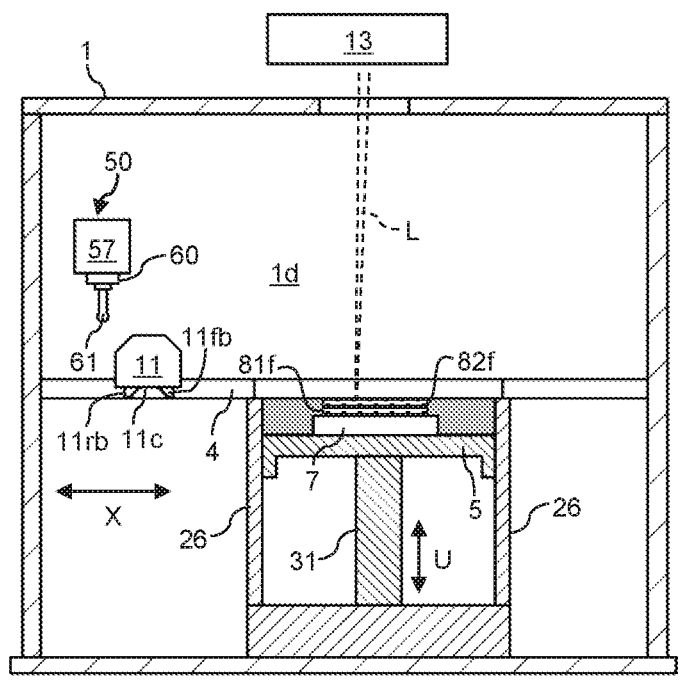
FIG. 7 is a drawing showing the lamination shaping method (lamination step) using the lamination shaping apparatus.
Figure 8:
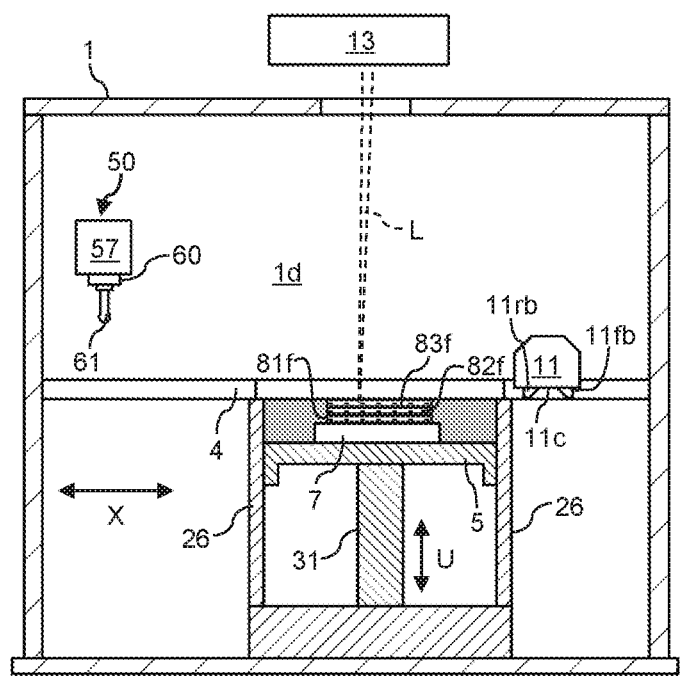
FIG. 8 is a drawing showing the lamination shaping method (lamination step) using the lamination shaping apparatus.

Then, a predetermined area of the second material powder layer 8 is sintered by irradiating the predetermined area with laser light L. Thus, as shown in FIG. 7, a second sintered layer 82f is obtained. Similarly, a third sintered layer 83f is obtained (FIG. 8).

Figure 9:
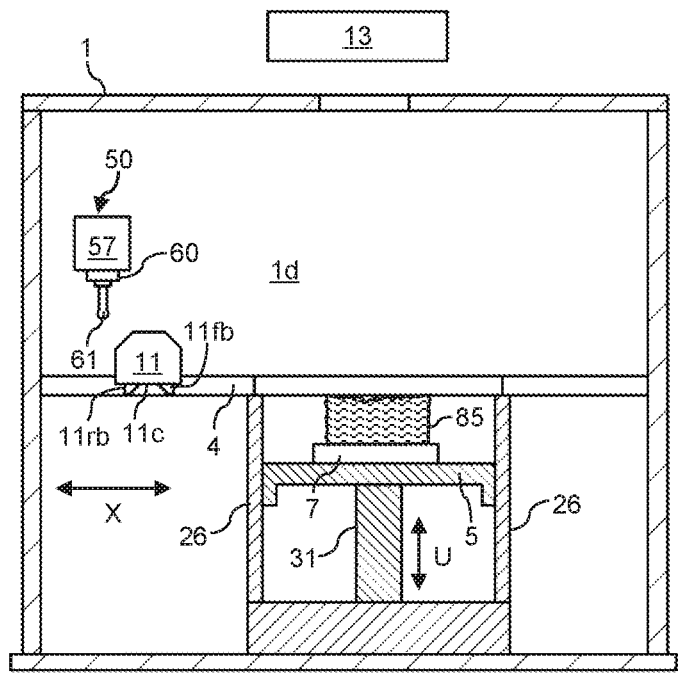
FIG. 9 is a drawing showing the lamination shaping method (lamination step) using the lamination shaping apparatus.

By repeating the above steps, fourth and later sintered layers are obtained, forming a first temporarily shaped product 85 (FIG. 9). The adjacent sintered layers strongly adhere to each other.

Reference Surface Shaping Step

Figure 10:
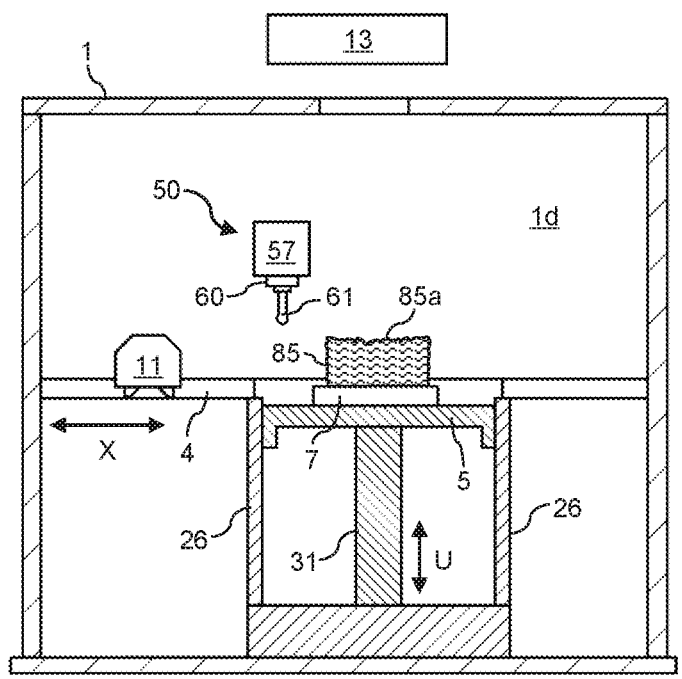
FIG. 10 is a drawing showing the lamination shaping method (lamination step) using the lamination shaping apparatus.

A subsequent reference surface shaping step is characterized in that by shaping at least parts of some surfaces 85a of the first temporarily shaped product 8, two reference surfaces (the first and the second reference surfaces) perpendicular to the shaping table 5 and perpendicular to each other and the reference surface (the third reference surface) parallel with the shaping table 5 are formed. First, the machining head 57 and shaping table 5 are moved to the respective initial positions with the first temporarily shaped product 85 placed on the shaping plate 7 disposed on the shaping table 5. Note that while the shaping table 5 is located in the initial position, the first temporarily shaped product 85 is located in a position lower than the height of the tool bit 61 (FIG. 10). While the machining head 57 is located in the initial position, the tool bit 61 is located in a position higher than the height of the first temporarily shaped product 85. Note that while the machining head 57 is located in the initial position, it does not contact the first temporarily shaped product 85 even if the shaping table 5 is raised in the direction of the arrow U, that is, even if the tool bit 61 is lowered relative to the shaping table 5 in the direction of the arrow Z.

Then, at least parts of some surfaces 85a of the first temporarily shaped product 85 are shaped. This will be described in detail with reference to FIGS. 11, 12A to 12H, 13A to 13H, 14A to 14H, 15A to 15H, and 16A to 16P. Specifically, FIGS. 12A to 12E, 13A to 13E, 14A to 14E, 15A to 15E, and 16A to 16L are schematic views showing the reference surface shaping step seen from above the first temporarily shaped product 85. FIGS. 12F to 12H, 13F to 13H, 14F to 14H, 15F to 15H, and 16M to 16P are schematic views when the reference surface shaping step is seen from the front, back, or side of the first temporarily shaped product 85. Reference surfaces 85b of the present embodiment are formed on the upper surface of the surfaces 85a of the first temporarily shaped product 85 and on upper portions of side surfaces of the surfaces 85a.

Figure 11:
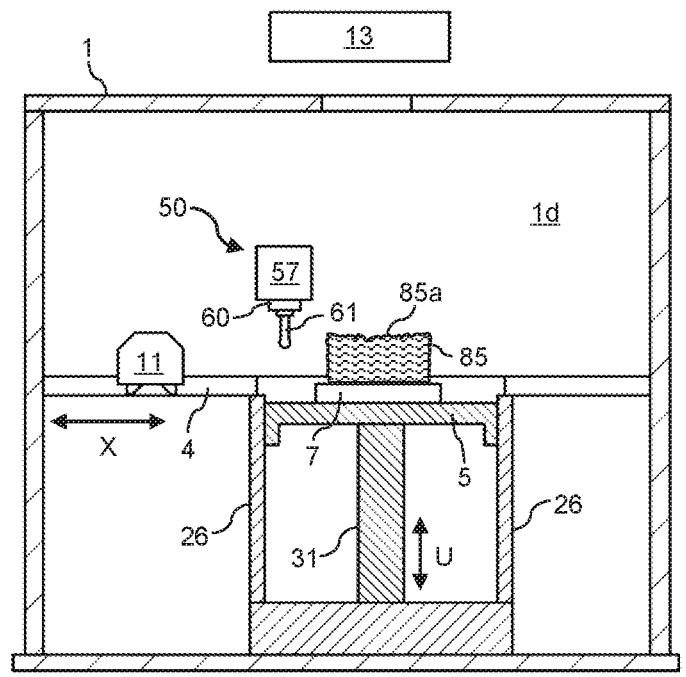
FIG. 11 is a drawing showing the lamination shaping method (reference surface shaping step) using the lamination shaping apparatus.
Figure 12:
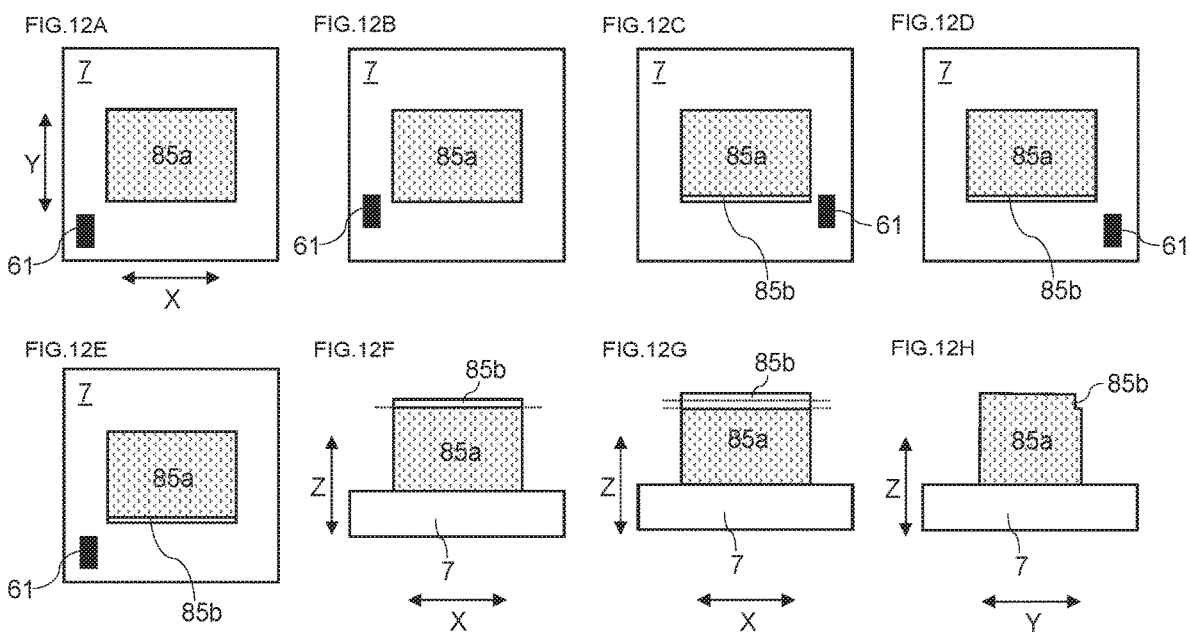
FIGS. 12A to 12E are schematic views when the reference surface shaping step is seen from above a first temporarily shaped product.
FIGS. 12F and 12G are schematic views when the reference surface shaping step is seen from the front side of the first temporarily shaped product.
FIG. 12H is a schematic view when the reference surface shaping step is seen from the left side of the first temporarily shaped product.
Figure 13:
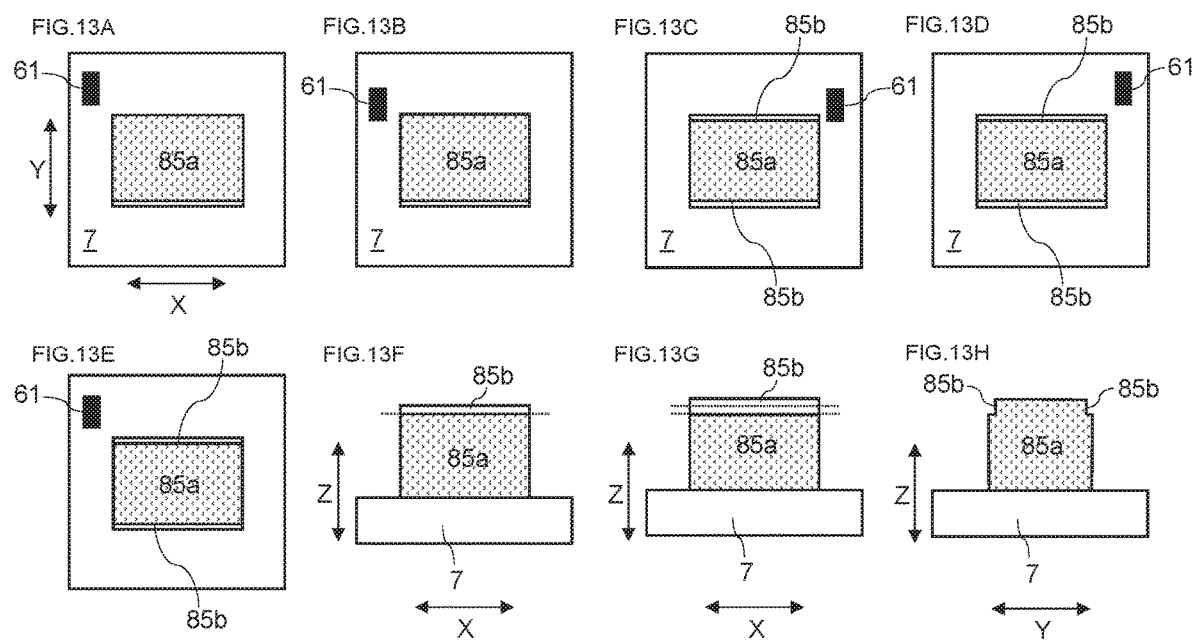
FIGS. 13A to 13E are schematic views when the reference surface shaping step is seen from above the first temporarily shaped product.
FIGS. 13F and 13G are schematic views when the reference surface shaping step is seen from the back side of the first temporarily shaped product.
FIG. 13H is a schematic view when the reference surface shaping step is seen from the right side of the first temporarily shaped product.
Figure 14:
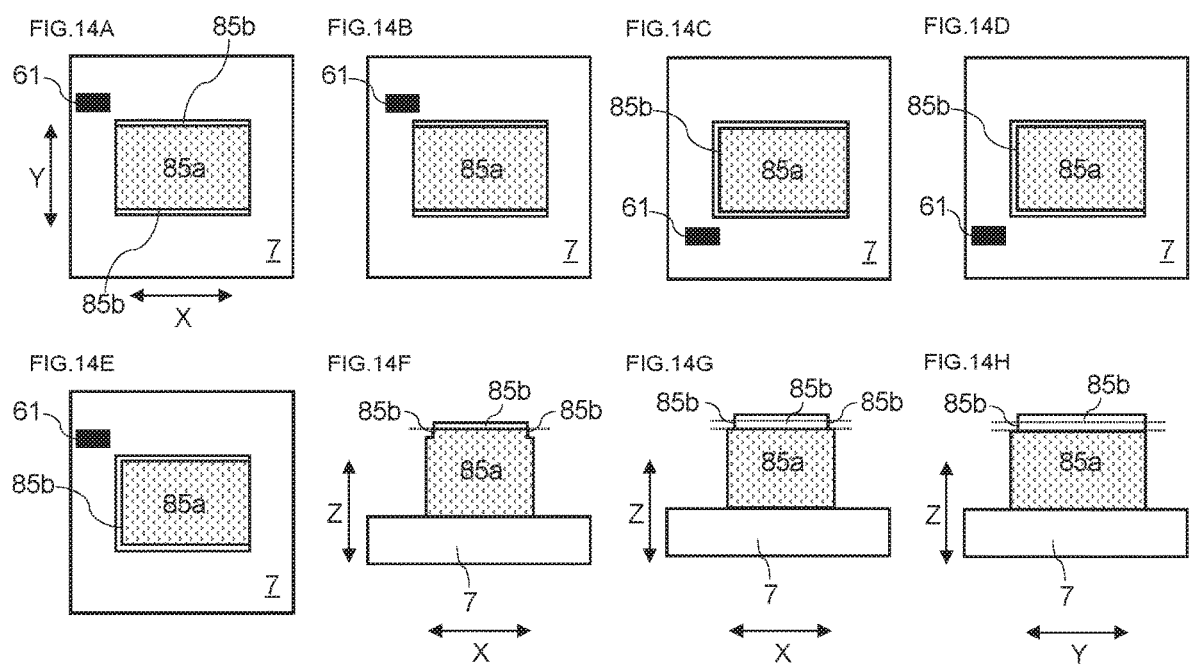
FIGS. 14A to 14E are schematic views when the reference surface shaping step is seen from above the first temporarily shaped product.
FIGS. 14F and 14G are schematic views when the reference surface shaping step is seen from the left side of the first temporarily shaped product.
FIG. 14H is a schematic view when the reference surface shaping step is seen from the front side of the first temporarily shaped product.
Figure 15:
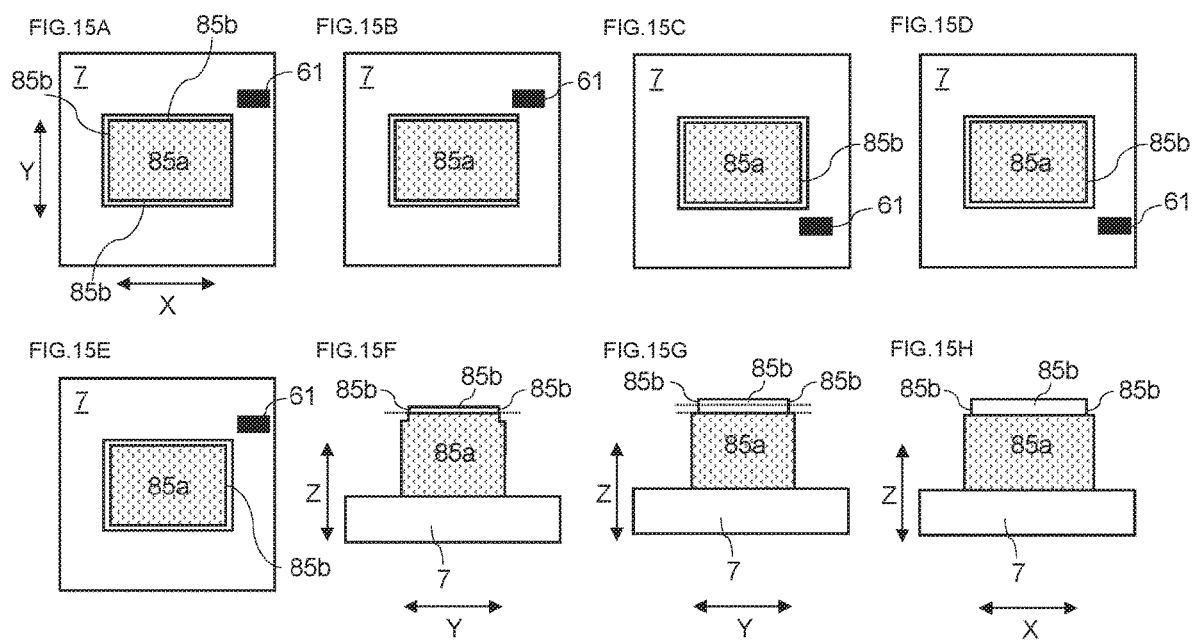
FIGS. 15A to 15E are schematic views when the reference surface shaping step is seen from above the first temporarily shaped product.
FIGS. 15F and 15G are schematic views when the reference surface shaping step is seen from the right side of the first temporarily shaped product.
FIG. 15H is a schematic view when the reference surface shaping step is seen from the back side of the first temporarily shaped product.
Figure 16:
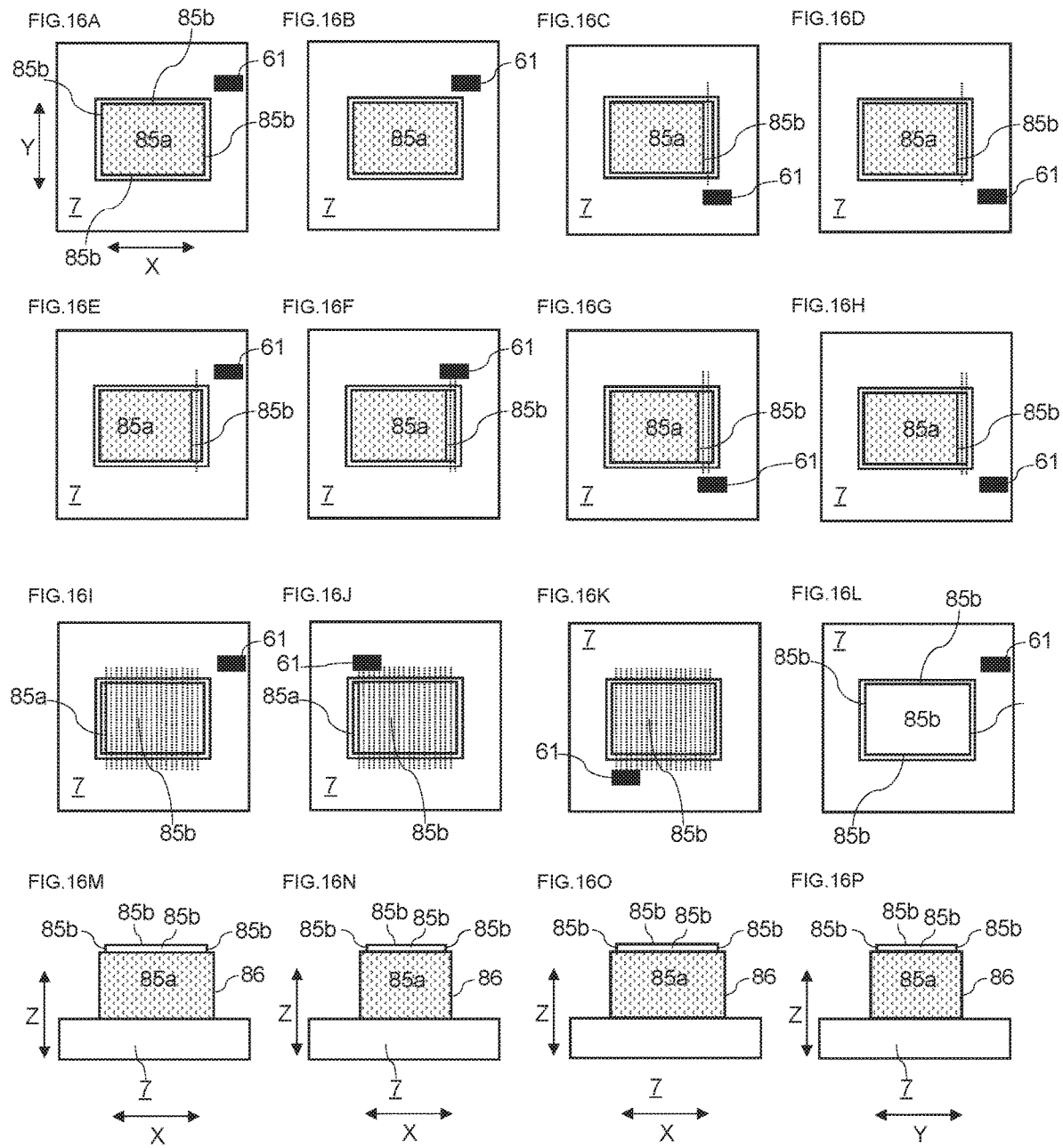
FIGS. 16A to 16L are schematic views when the reference surface shaping step is seen from above the first temporarily shaped product.
FIG. 16M is a schematic view when the reference surface shaping step is seen from the front side of the second temporarily shaped product.
FIG. 16N is a schematic view when the reference surface shaping step is seen from the left side of the second temporarily shaped product.
FIG. 16O is a schematic view when the reference surface shaping step is seen from the back side of the second temporarily shaped product.
FIG. 16P is a schematic view when the reference surface shaping step is seen from the right side of the second temporarily shaped product.
Figure 17:
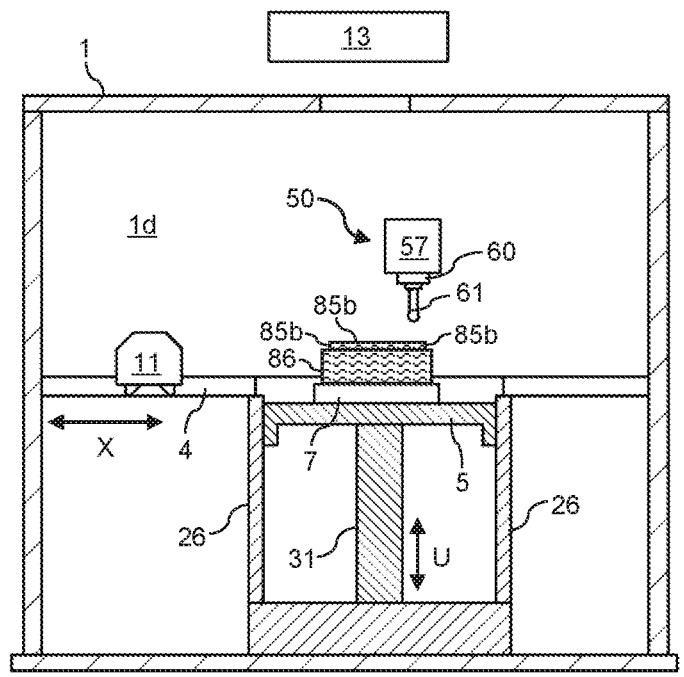
FIG. 17 is a drawing showing the lamination shaping method (reference surface shaping step) using the lamination shaping apparatus.

First, a reference surface 85b (the first reference surface) is formed by shaping an upper portion of the front-side surface (the lower-side surface in FIG. 12A) of the side surfaces parallel with the direction of the arrow X, of the first temporarily shaped product 85. The tool bit 61 is previously rotated so that the blade edge is oriented in a direction in which the blade edge can perform shaping when the tool bit 61 moves from the left side to the right side along the direction of the arrow X. If the tool bit 61 is already oriented in the required direction, the tool bit 61 need not be rotated. Then, the shaping table 5 is raised in the direction of the arrow U from the initial position (FIG. 10 and FIG. 12A). Thus, the height of the surface 85a to be shaped, of the first temporarily shaped product 85 is made higher than the blade edge of the tool bit 61 by a predetermined distance (FIG. 11 and FIG. 12A). The predetermined distance may be greater or smaller than the size in the direction of the arrow Z, of the desired reference surface 85b. If the predetermined distance is smaller, the shaping table 5 is raised in a predetermined pitch, and the tool bit 61 performs shaping multiple times.

Then, the tool bit 61 is positioned by moving it from the front side to a predetermined position on the back side (the higher side in FIG. 12B) along the direction of the arrow Y. Note that the predetermined position is a position such that an upper portion of the front-side side surface of the first temporarily shaped product 85 contacts the tool bit 61 when moving the tool bit 61 in the direction of the arrow X, as shown in FIG. 12C.

Then, the tool bit 61 is moved from the left side to the right side along the direction of the arrow X. Thus, there is shaped the ends and vicinity of the upper portion of the front-side side surface of the first temporarily shaped product 85 (FIG. 12C and FIG. 12F).

Then, the tool bit 61 is moved from the back side to the front side along the direction of the arrow Y so that the position thereof in the direction of the arrow Y becomes the same as the position thereof in the direction of the arrow Y in the initial position shown in FIG. 12A (FIG. 12D).

Then, the tool bit 61 is moved from the right side to the left side along the direction of the arrow X. Thus, the tool bit 61 is again moved to the initial position shown in FIG. 12A (FIG. 12E).

Figure 18A:
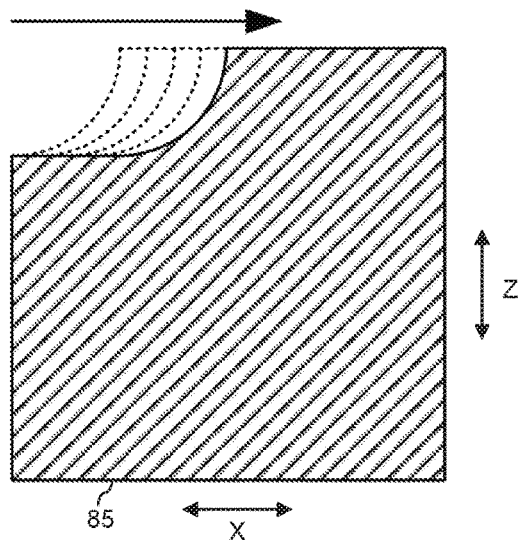
Figure 18B:
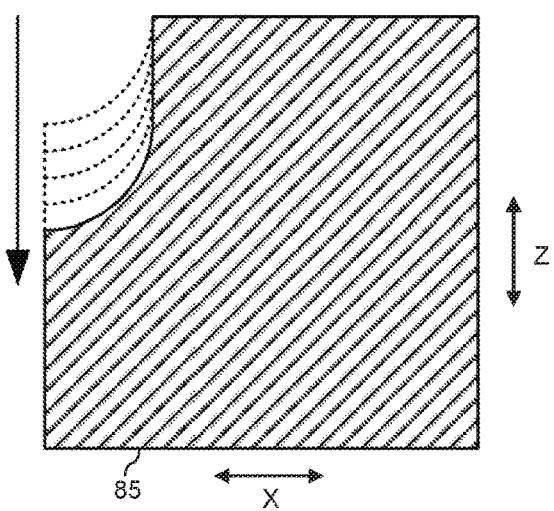

To enlarge the reference surface 85b, for example, the following steps are repeated: the shaping table 5 is again raised in the direction of the arrow U by a predetermined distance; the tool bit 61 is moved from the front side to a predetermined position on the back side along the direction of the arrow Y; and the tool bit 61 is moved from the left side to the right side along the direction of the arrow X to further shape the ends and vicinity of the upper portion of the front-side side surface of the first temporarily shaped product 85 (FIG. 12G, FIG. 12H, and FIG. 18B). If the surface 85a of the first temporarily shaped product 85 has large recesses and protrusions, for example, the following steps may be repeated: the tool bit 61 is moved from the front side to a predetermined position on the back side which is farther from the front side than the previous position, along the direction of the arrow Y; the position in the direction of the arrow U of the shaping table 5 is lowered to the initial position; then the shaping table 5 is again raised in the direction of the arrow U by a predetermined distance; and the tool bit 61 is moved from the left side to the right side along the direction of the arrow X to further shape the ends and vicinity of the upper portion of the front-side side surface of the first temporarily shaped product 85 (FIG. 17C).

Then, a reference surface 85b (the first reference surface) is formed by shaping an upper portion of the back-side (the upper side in FIG. 13A) surface of the side surfaces parallel with the direction of the arrow X, of the first temporarily shaped product 85. The tool bit 61 is previously rotated so that the blade edge is oriented in a direction in which the blade edge can perform shaping when the tool bit 61 moves from the left side to the right side along the direction of the arrow X. If the tool bit 61 is already oriented in the required direction, the tool bit 61 need not be rotated. The machining head 57 and shaping table 5 are moved to the respective initial positions. The initial positions may be changed to the proximity of the reference surface 85b to be shaped (FIG. 13A). Then, the shaping table 5 is raised in the direction of the arrow U from the initial position. Thus, the height of the surface 85a to be shaped, of the first temporarily shaped product 85 is made higher than the end of the tool bit 61 by a predetermined distance. The predetermined distance is as described above.

Then, the tool bit 61 is positioned by moving it from the back side to a predetermined position on the front side (the lower side in FIG. 13B) along the direction of the arrow Y. The predetermined position is as described above.

Then, the tool bit 61 is moved from the left side to the right side along the direction of the arrow X. Thus, the ends and vicinity of the upper portion of the back-side side surface of the first temporarily shaped product 85 are shaped (FIG. 13C and FIG. 13F).

Then, the tool bit 61 is moved from the front side to the back side along the direction of the arrow Y so that the position thereof in the direction of the arrow Y becomes the same as the position thereof in the direction of the arrow Y in the initial position shown in FIG. 13A (FIG. 13D).

Then, the tool bit 61 is moved from the right side to the left side along the direction of the arrow X. Thus, the tool bit 61 is again moved to the initial position shown in FIG. 13A (FIG. 13E).

To enlarge the reference surface 85b, for example, the following steps are repeated: the shaping table 5 is again raised in the direction of the arrow U by a predetermined distance; the tool bit 61 is moved from the back side to a predetermined position on the front side along the direction of the arrow Y; and the tool bit 61 is moved from the left side to the right side along the direction of the arrow X to further shape the ends and vicinity of the upper portion of the back-side side surface of the first temporarily shaped product 85 (FIG. 13G, FIG. 13H, and FIG. 18B). If the surface 85a of the first temporarily shaped product 85 has large recesses and protrusions, the above steps may be repeated except that the front side and back side are replaced with each other. Note that the tool bit 61 may shape the surface 85a of the first temporarily shaped product 85 by using, as the initial position, a position which is located on the right side in the direction of the arrow X and on the back side in the direction of the arrow Y, being previously rotated so that the blade edge is oriented in a direction in which the blade edge can perform shaping when the tool bit 61 moves from the right side to the left side along the direction of the arrow X, and moving from the right side to the left side along the direction of the arrow X.

Then, a reference surface 85b (the second reference surface) is formed by shaping an upper portion of the left-side (the left side in FIG. 14A) side surface of the side surfaces parallel with the direction of the arrow Y, of the first temporarily shaped product 85. The tool bit 61 is previously rotated so that the blade edge is oriented in a direction in which the blade edge can perform shaping when the tool bit 61 moves from the back side to the front side along the direction of the arrow Y. If the tool bit 61 is already oriented in the required direction, the tool bit 61 need not be rotated. The machining head 57 and shaping table 5 are moved to the respective initial positions. The initial positions may be changed to the proximity of the reference surface 85b to be shaped. Then, the shaping table 5 is raised in the direction of the arrow U from the initial position. Thus, the height of the surface 85a to be shaped is made higher than the end of the tool bit 61 by a predetermined distance. The predetermined distance is as described above.

Then, the tool bit 61 is positioned by moving it from the left side to a predetermined position on the right side (the right side in FIG. 14B) along the direction of the arrow X. The predetermined position is as described above.

Then, the tool bit 61 is moved from the back side to the front side along the direction of the arrow Y. Thus, the ends and vicinity of the upper portion of the left-side side surface of the first temporarily shaped product 85 are shaped (FIG. 14C and FIG. 14F).

Then, the tool bit 61 is moved from the right side to the left side along the direction of the arrow X so that the position thereof in the direction of the arrow X becomes the same as the position thereof in the direction of the arrow X in the initial position shown in FIG. 14A (FIG. 14D).

Then, the tool bit 61 is moved from the front side to the back side along the direction of the arrow Y. Thus, the tool bit 61 is again moved to the initial position shown in FIG. 14A (FIG. 14E).

To enlarge the reference surface 85*b*, for example, the following steps are repeated: the shaping table 5 is again raised in the direction of the arrow U by a predetermined distance; the tool bit 61 is moved from the left side to a predetermined position on the right side along the direction of the arrow X; and the tool bit 61 is moved from the back side to the front side along the direction of the arrow Y to further shape the ends and vicinity of the upper portion of the left-side side surface of the first temporarily shaped product 85 (FIG. 14G, FIG. 14H, and FIG. 18B). If the surface 85*a* of the first temporarily shaped product 85 has large recesses and protrusions, for example, the following steps may be repeated: the tool bit 61 is moved from the left side to a predetermined position on the right side which is farther from the left side than the previous position, along the direction of the arrow X; the position in the direction of the arrow U of the shaping table 5 is lowered to the initial position; then the shaping table 5 is again raised in the direction of the arrow U by a predetermined distance; the tool bit 61 is moved from the left side to a predetermined position on the right side which is farther from the left side than the previous position, along the direction of the arrow X; and then the tool bit 61 is moved from the back side to the front side along the direction of the arrow Y to further shape the ends and vicinity of the upper portion of the left-side side surface of the first temporarily shaped product 85 (FIG. 17C).

Then, a reference surface 85*b* (the second reference surface) is formed by shaping an upper portion of the right-side (the right side in FIG. 15A) surface of the side surfaces parallel with the direction of the arrow Y, of the first temporarily shaped product 85. The tool bit 61 is previously rotated so that the blade edge is oriented in a direction in which the blade edge can perform shaping when the tool bit 61 moves from the back side to the front side along the direction of the arrow Y. If the tool bit 61 is already oriented in the required direction, the tool bit 61 need not be rotated. The machining head 57 and shaping table 5 are moved to the respective initial positions. The initial positions may be changed to the proximity of the reference surface 85*b* to be shaped. Then, the shaping table 5 is raised in the direction of the arrow U from the initial position. Thus, the height of the surface 85*a* to be shaped, of the first temporarily shaped product 85 is made higher than the end of the tool bit 61 by a predetermined distance. The predetermined distance is as described above.

Then, the tool bit 61 is positioned by moving it from the right side to a predetermined position on the left side (the left side in FIG. 15B) along the direction of the arrow X. The predetermined position is as described above.

Then, the tool bit 61 is moved from the back side to the front side along the direction of the arrow Y. Thus, the ends and vicinity of the upper portion of the right-side side surface of the first temporarily shaped product 85 is shaped (FIG. 15C and FIG. 15F).

Then, the tool bit 61 is moved from the left side to the right side along the direction of the arrow X so that the position thereof in the direction of the arrow X becomes the same as the position thereof in the direction of the arrow X in the initial position shown in FIG. 15A (FIG. 15D).

Then, the tool bit 61 is moved from the front side to the back side along the direction of the arrow Y, thus, the tool bit 61 is again moved to the initial position shown in FIG. 15A (FIG. 15E).

To enlarge the reference surface 85*b*, for example, the following steps are repeated: the shaping table 5 is again raised in the direction of the arrow U by a predetermined distance; the tool bit 61 is moved from the right side to a predetermined position on the left side along the direction of the arrow X; and the tool bit 61 is moved from the back side to the front side along the direction of the arrow Y to further shape the ends and vicinity of the upper portion of the left-side side surface of the first temporarily shaped product 85 (FIG. 15G, FIG. 15H, and FIG. 18B). If the surface 85*a* of the first temporarily shaped product 85 has large recesses and protrusions, the above steps may be repeated except that the left side and right side are replaced with each other. Note that the tool bit 61 may shape the surface 85*a* of the first temporarily shaped product 85 by using, as the initial position, a position which is located on the right side in the direction of the arrow X and on the front side in the direction of the arrow Y, being previously rotated so that the blade edge is oriented in a direction in which the blade edge can perform shaping when the tool bit 61 moves from the front side to the back side along the direction of the arrow Y, and moving from the front side to the back side along the direction of the arrow Y.

Then, a reference surface 85*b* (the third reference surface) is formed by shaping the upper surface of the first temporarily shaped product 85. First, the tool bit 61 is previously rotated so that the blade edge is oriented in a direction in which the blade edge can perform shaping when the tool bit 61 moves from the back side to the front side along the direction of the arrow Y. If the tool bit 61 is already oriented in the required direction, the tool bit 61 need not be rotated. The machining head 57 and shaping table 5 are moved to the respective initial positions. The initial positions may be changed to the proximity of the reference surface 85*b* to be shaped. Then, the shaping table 5 is raised in the direction of the arrow U from the initial position (FIG. 16A). Thus, the height of the surface 85*a* to be shaped, of the first temporarily shaped product 85 is made higher than the end of the tool bit 61 by a predetermined distance. The predetermined distance is as described above.

Then, the tool bit 61 is positioned by moving it from the right side (the right side in FIG. 16A) to the left side (the left side in FIG. 16B) along the direction of the arrow X (FIG. 16B). Note that this position is a position such that the right end and vicinity of the surface 85*a* of the first temporarily shaped product 85 and the tool bit 61 contact each other when the tool bit 61 is moved in the direction of the arrow Y until becoming a state shown in FIG. 16C.

Then, the tool bit 61 is moved from the back side to the front side along the direction of the arrow Y. Thus, the left end and vicinity of the surface 85*a* of the first temporarily shaped product 85 is shaped (FIG. 16C). The surface thus shaped serves as a reference surface 85*b* (at this point in time, only the left end and vicinity).

Then, the tool bit 61 is moved from the left side to the right side along the direction of the arrow X so that the position thereof in the direction of the arrow X becomes the same as the position thereof in the direction of the arrow X in the initial position shown in FIG. 16A (FIG. 16D).

Then, the tool bit 61 is moved from the front side to the back side along the direction of the arrow Y. Thus, the tool bit 61 is again moved to the initial position shown in FIG. 16A (FIG. 16E).

Then, the tool bit 61 is positioned by moving it from the right side to the left side along the direction of the arrow X (FIG. 16F). Note that this position is a position such that the front end and vicinity of the surface 85*a* of the first temporarily shaped product 85 and the tool bit 61 contact each other when the tool bit 61 is moved until becoming a state shown in FIG. 16G.

Then, the tool bit 61 is moved from the back side to the front side along the direction of the arrow Y. Thus, the right end (the boundary between the surface 85*a* and the reference surface 85*b* of the first temporarily shaped product 85) and vicinity of the surface 85*a* of the first temporarily shaped product 85 are shaped (FIG. 16G).

Then, the tool bit 61 is moved from the left side to the right side along the direction of the arrow X so that the position thereof in the direction of the arrow X becomes the same as the position thereof in FIG. 16A or FIG. 16E (FIG. 16H).

By repeating similar steps as shown in FIG. 18A, the upper surface of the first temporarily shaped product 85 is finally shaped into a reference surface 85*b*, as shown in FIGS. 16I to 16L. As a result, a second temporarily shaped product 86 is obtained (FIGS. 16M to 16P and 17).

Figure 18C:
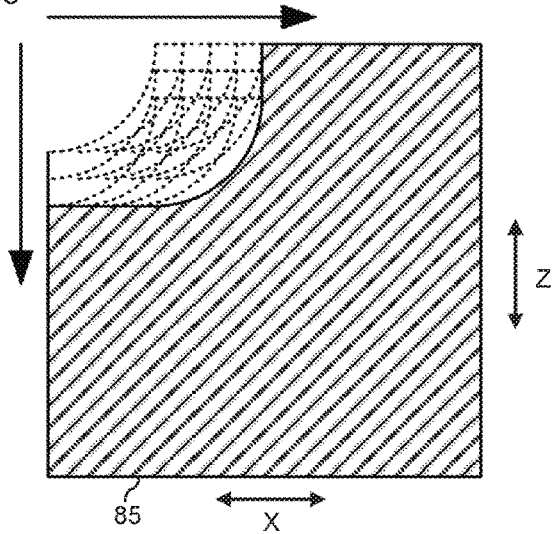

If the surface 85*a* of the first temporarily shaped product 85 has large recesses and protrusions, for example, the shaping table 5 may be raised in the direction of the arrow U by a predetermined distance and then the upper surface of the first temporarily shaped product 85 may be repeatedly shaped in a similar manner (FIG. 18C).

The tool bit 61 need not be returned to the initial position using the above method. For example, there may be used a method involving temporarily lowering the shaping table 5 to a position where the first temporarily shaped product 85 is lower than the tool bit 61, in the direction of the arrow U, then moving the tool bit 61 to a predetermined position in which the first temporarily shaped product and the tool bit 61 do not contact each other even if the shaping table 5 is raised again in the direction of the arrow U, and returning the shaping table 5 to the height (the height shown in FIG. 11) where the tool bit 61 can perform shaping again. Note that the tool bit 61 may shape the surface 85*a* of the first temporarily shaped product 85 by using, as the initial position, a position which is located on the right side in the direction of the arrow X and on the front side in the direction of the arrow Y, being previously rotated so that the blade edge is oriented in a direction in which the blade edge can perform shaping when the tool bit 61 moves from the front side to the back side along the direction of the arrow Y, and moving from the front side to the back side along the direction of the arrow Y.

Figure 19A:
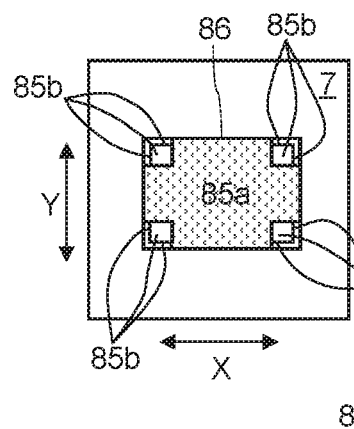
FIGS. 19A, 19B, and 19C are schematic views of a second temporarily shaped product of another embodiment seen from above, front side, and left side, respectively.
Figure 19B:
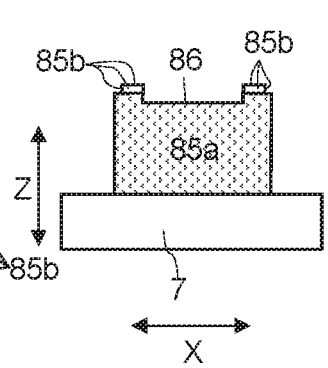
Figure 19C:
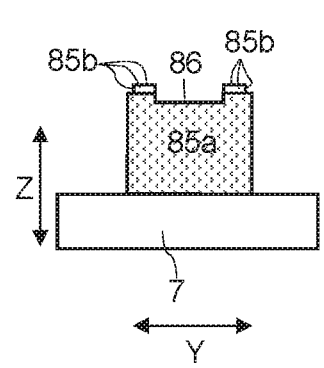
Figure 20A:
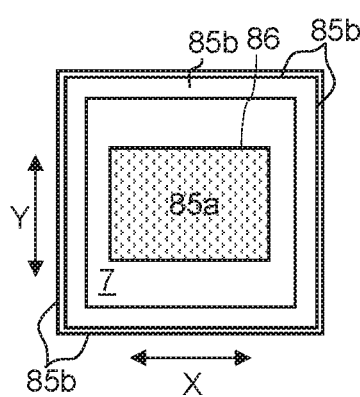
FIGS. 20A, 20B, and 20C are schematic views of a second temporarily shaped product of yet another embodiment seen from above, front side, and left side, respectively.
Figure 20B:
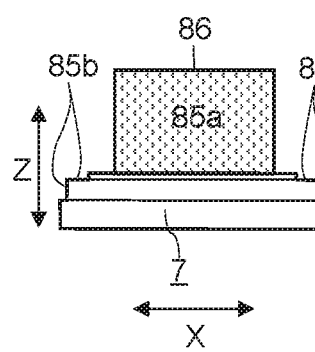
Figure 20C:
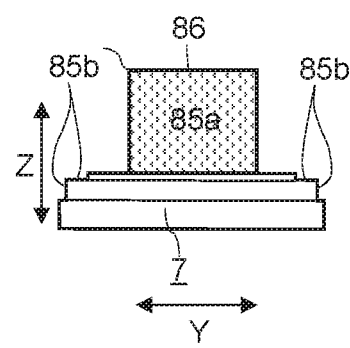

As shown in FIGS. 19A to 19C, at least one reference surface 85*b* may be formed on at least one protrusion formed in the first temporarily shaped product 85 as necessary. Also, as shown in FIGS. 20A to 20C, at least one reference surface 85*b* may be formed on the upper surface or side surface of the shaping plate 7 as necessary. Also, at least one reference surface 85*b* may be formed on at least one protrusion formed solely to form a reference surface 85*b* on the shaping plate 7, as necessary.

Secondary Machining Step

Finally, a secondary machining step is performed by an apparatus different from the lamination shaping apparatus of the present embodiment. That is, the second temporarily shaped product 86 is cut to obtain a desired laminated shaped product. Any type of apparatus may be used in the secondary machining step. While a conventional combined machine must perform dry machining, where cutting oil or cooling water is not used, a cutting apparatus that differs from the lamination shaping apparatus and employs wet machining, for example, can be used in the secondary machining step.

When fixing the second temporarily shaped product 86 to the apparatus used in the secondary machining step, the reference surfaces 85*b* thereof are used to position the second temporarily shaped product 86. For example, the apparatus used in the secondary machining step is a cutting apparatus including a main shaft that rotates around an R shaft in the vertical direction, a machining head that vertically moves the main shaft in a Z direction parallel with the main shaft, and a machining table that moves in X and Y directions perpendicular to the Z direction and perpendicular to each other.

The second temporarily shaped product 86 is fixed onto the machining table. The machining head has a dial gauge mounted thereon. The dial gauge moves in the same direction as the machining head. The second temporarily shaped product 86 is moved together with the machining table in the X direction with the dial gauge in contact with the reference surface 85*b* parallel with the direction of the arrow X, of the second temporarily shaped product 86. At this time, the position where the second temporarily shaped product 86 is fixed onto the machining table is adjusted until the amount of change of the value indicated by the dial gauge falls within a predetermined range. Similarly, the second temporarily shaped product 86 is moved together with the machining table in the Y direction with the dial gauge in contact with the reference surface 85*b* parallel with the direction of the arrow Y, of the second temporarily shaped product 86. At this time, the position where the second temporarily shaped product 86 is fixed onto the machining table is adjusted until the amount of change of the value indicated by the dial gauge falls within a predetermined range. Also, the second temporarily shaped product 86 is moved together with the machining table in the X and Y directions with the dial gauge in contact with the reference surface 85*b* formed on the upper surface of the second temporarily shaped product 86. At this time, the position where the second temporarily shaped product 86 is fixed onto the machining table is adjusted, for example, by sandwiching a shim plate therebetween, until the amount of change of the value indicated by the dial gauge falls within predetermined ranges in the X and Y directions.

Also, the cutting apparatus detects the coordinate values of the second temporarily shaped product 86 on the machining table, for example, using a reference ball mounted on the main shaft and performs correction so that the coordinate system of the cutting apparatus and the coordinate system of the second temporarily shaped product 86 match each other.

For example, in the case of the second temporarily shaped product 86 shown in FIGS. 16M to 16P, the cutting apparatus typically detects X coordinates corresponding to the same Y coordinate and the same Z coordinate of the left and right two reference surfaces 85b (the second reference surface) of the second temporarily shaped product 86 using the reference ball mounted on the main shaft and computes an intermediate X coordinate between the X coordinates. The cutting apparatus then detects Y coordinates corresponding to the same X coordinate and the same Z coordinate of the front and back two reference surfaces 85b (the first reference surface) of the second temporarily shaped product 86 and computes an intermediate Y coordinate between the Y coordinates. The cutting apparatus then detects the Z coordinate of a predetermined position of the machining table and a Z coordinate corresponding to a predetermined X coordinate and a predetermined Y coordinate of the reference surface 85b (the third reference surface) of the upper surface of the second temporarily shaped product 86, computes an intermediate Z coordinate between the Z coordinates, and detects the center coordinates of the second temporarily shaped product 86.

Also, in the case of the second temporarily shaped product 86 shown in FIGS. 16M to 16P, the cutting apparatus typically detects two Y coordinates corresponding to different two X coordinates and the same Z coordinate of one of the front and rear two reference surfaces 85b (the first reference surface) of the second temporarily shaped product 86. The cutting apparatus then detects two X coordinates corresponding to different two Y coordinates and the same Z coordinate of one of the left and right two reference surfaces 85b (the second reference surface) of the second temporarily shaped product 86 and detects the displacement in the rotation direction in an XY plane.

Also, in the case of the second temporarily shaped product 86 shown in FIGS. 16M to 16P, the cutting apparatus typically detects two Z coordinates corresponding to different two X coordinates and the same Y coordinate of the reference surface 85b (the third reference surface) of the upper surface of the second temporarily shaped product 86 and detects the inclination in the X direction. Also, in the case of the second temporarily shaped product 86 shown in FIGS. 16M to 16P, the cutting apparatus typically detects two Z coordinates corresponding to different two Y coordinates and the same X coordinate of the reference surface 85b (the third reference surface) of the upper surface of the second temporarily shaped product 86 and detects the inclination in the Y direction.

Thus, even if the different machine performs secondary machining on the laminated shaped product, machining can be performed easily and accurately.

As described above, for example, one reference surface 85b (the third reference surface) may be shaped as a surface parallel with the shaping table 5, or multiple reference surfaces 85b (the first and the second reference surfaces) may be shaped as surfaces parallel with the shaping table 5. Not only a surface parallel with the shaping table 5 (FIG. 18A) but also a surface perpendicular thereto (FIG. 18B) may be shaped. Also, if the surface 85a of the first temporarily shaped product 85 has large recesses and protrusions, a reference surface 85b (the first to the third reference surfaces) may be shaped in a deep position from the surface 85a by combining the above types of shaping (FIG. 18C). Also, depending on the type of the tool bit 61 used for shaping, the turning mechanism 60 of the machining head 57 may be configured so that it can perform shaping on a going journey, then turn the tool bit 61 by 180°, and perform shaping also on a return journey, that is, can alternately turn the tool bit 61 by 180° on a going journey and a return journey. Note that the turning mechanism 60, first horizontal movement mechanisms, and/or second horizontal movement mechanism may be driven at the same time or at a required timing to shape a reference surface 85b (the first to the third reference surfaces) as necessary without being limited to the operation described in the embodiment. Going journey return journey 3. Conclusion While the embodiment of the present invention and the modifications thereof have been described, these are illustrative only and are not intended to limit the scope of the present invention. The novel embodiment can be carried out in various aspects, and various omissions, replacements, or changes may be made thereto without departing from the spirit of the present invention. The embodiment and modifications thereof are included in the scope and spirit of the invention, as well as are included in the scope of the invention and equivalents thereof described in Claims.

The invention claimed is:

1. A lamination shaping apparatus configured to form a laminated shaped product that has yet to be machined into a shape of a desired final product by a different machine, comprising:
  forming a material powder layer having a predetermined thickness on a shaping table movable in the direction of one vertical axis,
    the material powder layer corresponding to each of division layers obtained by dividing a shape of the laminated shaped product by the predetermined thickness,
  and by irradiating a predetermined area of the material powder layer with laser light to form a sintered layer, and repeating formation of the sintered layer, the lamination shaping apparatus further comprising:
  a pair of first horizontal movement mechanisms;
  a gantry disposed on the pair of horizontal movement mechanisms;
  a second horizontal movement mechanism mounted on the gantry; and
  a machining head disposed on the second horizontal movement mechanism, wherein
  the shaping table is disposed between the pair of first horizontal movement mechanisms,
  the second horizontal movement mechanism is disposed above the shaping table,
  the machining head includes a tool bit,
  the tool bit is configured to shape a first and a second reference surfaces and a third reference surface with respect to the laminated shaped product,
    the first and the second reference surfaces perpendicular to the shaping table and perpendicular to each other, and
    the third reference surface parallel with the shaping table,
    the first to the third reference surfaces are reference surfaces used for positioning when the different machine machines the laminated shaped product, and
  the machining head is configured to move the tool bit in the directions of two horizontal axes parallel with the shaping table and to turn around an axis in the direction of the one vertical axis.

2. The lamination shaping apparatus of claim 1, wherein the gantry is disposed on the pair of first horizontal movement mechanisms so as to be movable in a first direction,
the machining head is disposed on the second horizontal movement mechanism so as to be movable in a second direction perpendicular to the first direction, and
the first direction and the second direction are horizontal directions.

3. The lamination shaping apparatus of claim 1, wherein the machining head is configured to turn the tool bit so that the tool bit is placed in one of a first state and a second state, and
the second state is a state obtained by turning the tool bit in the first state by 90°.

4. The lamination shaping apparatus of claim 2, further comprising:
a base; and
a chamber covering the pair of first horizontal movement mechanisms, the gantry, the second horizontal movement mechanism, the machining head, and the tool bit on the base,
wherein
each of the first horizontal movement mechanisms comprises a first guide rail extending in the first direction and a first guide block that moves in the first direction while engaging with the first guide rail,
the second horizontal movement mechanism comprises a second guide rail extending in the second direction and a second guide block that moves while engaging with the second guide rail,
the first guide rail is fixed onto the base,
the gantry has one end fixed to the first guide block of one of the pair of first horizontal movement mechanisms and the other end fixed to the first guide block of the other of the pair of first horizontal movement mechanisms, and
the second guide rail is fixed to the gantry, and
the machining head is fixed to the second guide block.

5. The lamination shaping apparatus of claim 4, wherein the machining head comprises a turning mechanism mounted so as to be able to turn the tool bit,
the turning mechanism turns the tool bit so that the tool bit is placed in one of a first state and a second state,
the first state is a state in which when the machining head moves in the first direction, a blade of the tool bit is oriented in a direction in which the blade is able to shape the laminated shaped product in the first direction,
the second state is a state in which when the machining head moves in the second direction, the blade of the tool bit is oriented in a direction in which the blade is able to shape the laminated shaped product in the second direction, and
the second state is a state obtained by turning the tool bit in the first state by 90°.

* * * * *